United States Patent [19]

Rodriguez

[11] Patent Number: 4,587,066
[45] Date of Patent: May 6, 1986

[54] METHOD AND APPARATUS FOR FORMING MAGNETIC RECORDING MEDIA

[75] Inventor: Tomas Rodriguez, Newton Highlands, Mass.

[73] Assignee: Polaroid Corporation, Cambridge, Mass.

[21] Appl. No.: 627,054

[22] Filed: Jul. 2, 1984

[51] Int. Cl.$^4$ .................. B29B 13/08; B29C 35/10
[52] U.S. Cl. ...................... 264/22; 264/1.3;
264/1.4; 264/24; 264/25; 264/26; 264/106;
264/108; 425/3; 425/174.4; 425/174.8 R;
427/44; 427/48
[58] Field of Search ........... 264/24, 1.4, 1.3, 106–107,
264/22, 25, 26, 27; 425/3, 174.8 E, 174.8 R,
174.4; 427/44, 48

[56] References Cited

U.S. PATENT DOCUMENTS

| | | | |
|---|---|---|---|
| 2,584,441 | 2/1952 | Fredendall | 264/108 |
| 2,711,901 | 6/1954 | von Behren | 274/11.4 |
| 2,796,359 | 6/1957 | Speed | 117/62 |
| 3,021,230 | 2/1962 | Deriaud | 264/24 |
| 3,052,567 | 9/1962 | Gabor et al. | |
| 3,117,065 | 1/1964 | Wootten | 204/20 |
| 3,158,670 | 11/1964 | Camras | 264/108 |
| 3,185,775 | 5/1965 | Camras . | |
| 3,437,514 | 4/1969 | Burlant | 117/93.31 |
| 3,536,794 | 10/1970 | Stevenson | 264/24 |
| 3,586,743 | 6/1971 | Van Eeck | 264/24 |
| 3,775,178 | 11/1973 | Perrington et al. | 117/239 |
| 3,986,206 | 10/1976 | Fayling | 360/2 |
| 4,003,336 | 1/1977 | Koester et al. | 118/640 |
| 4,020,236 | 4/1977 | Aonuma et al. | 428/457 |
| 4,112,030 | 9/1978 | Kremzow | 264/106 |
| 4,163,823 | 8/1979 | Legras et al. | 428/304 |
| 4,197,563 | 4/1980 | Michaud | 360/56 |
| 4,208,447 | 6/1980 | Bate et al. | 427/48 |
| 4,294,782 | 10/1981 | Froehling | 264/22 |
| 4,332,834 | 6/1982 | Takri | 427/48 |
| 4,338,643 | 7/1982 | Tadokoro | 360/135 |
| 4,371,590 | 2/1983 | Izumi et al. | 428/555 |
| 4,382,244 | 5/1983 | Koester et al. | 335/284 |
| 4,394,404 | 7/1983 | Suzuki et al. | 427/48 |
| 4,407,853 | 10/1983 | Okita et al. | 427/44 |
| 4,416,943 | 11/1983 | Saito | 428/333 |
| 4,543,551 | 9/1985 | Petersen | 335/284 |
| 4,547,393 | 10/1985 | Asai et al. . | |

FOREIGN PATENT DOCUMENTS

| | | | |
|---|---|---|---|
| 55163633 | 8/1979 | Japan . | |
| 56-126132 | 10/1981 | Japan | 264/27 |
| 59-30245 | 2/1984 | Japan | 264/25 |
| 725872 | 3/1955 | United Kingdom | 264/24 |
| 956307 | 9/1982 | U.S.S.R. | 264/24 |

OTHER PUBLICATIONS

"The Promise of Perpendicular Magnetic Recording", BYTE Publications Inc., Mar. 1983–pp. 56, 58, 60, 62 and 64.

*Primary Examiner*—Jeffery Thurlow

[57] ABSTRACT

A method of and apparatus for producing magnetic media are disclosed. Magnetic particles in a magnetic layer are oriented under the influence of a magnetic field positioned on one side of the layer and having its lines of flux extending in a direction which is generally perpendicular to the magnetic layer, while the latter is cured by being subjected to electron beams incident on an opposite side of the layer, whereby the particles are fixed in the desired orientation.

12 Claims, 3 Drawing Figures

METHOD AND APPARATUS FOR FORMING MAGNETIC RECORDING MEDIA

BACKGROUND OF THE INVENTION

In general, this invention relates to a process and an apparatus for producing magnetic recording media.

Several techniques are known for preparing magnetic recording media. Typically, they include applying a magnetic coating containing tiny magnetic particles uniformly dispersed in a curable binder on a tape or disk surface. For giving the particles a preferred directional orientation they are passed through a magnetic orienting field. Use of magnetic recording media is determined typically by the orientation of the magnetic particles. For permanently setting these particles in a desired orientation, the coating is dried or cured.

The most common orientation for such particles is to have their axes of easy magnetization arranged in end-to-end fashion along the longitudinal extent of a tape. While such conventional longitudinal recording orientations have served satisfactorily there are number of factors which limit recording density.

Some have suggested that conventional longitudinal-recording has already been pushed close to its ultimate ceiling. Examples of known techniques for achieving the foregoing kinds of orientation are illustrated and described in the following U.S. Pat. Nos. 2,711,901; 3,117,065; 3,437,514 and 3,775,178. It is also known to have the particles arranged so that their axes of easy magnetization are generally transversely oriented with respect to the longitudinal extent of the tape. Also, it is known that in the production of floppy disks, magnets are used to disorient particles which have become oriented by virtue of coating.

For purposes of enhancing the density packing of the particles so as to improve recording characteristics of recording media, it has been proposed to orient these particles in such a manner that their axes of easy magnetization are situated generally 90° with respect to the tape surface. In other words, the particles are aligned generally perpendicularly with respect to the substrate surface they coat. By having them generally perpendicular, there is greater density of particles per unit area. Accordingly, more electronic information can be stored and read.

Previously referenced U.S. Pat. No. 2,711,401 also illustrates and describes a process, whereby the magnetic particles are oriented vertically with respect to the substrate. This is achieved under the influence of a magnetic field created by conventional permanent magnets spaced apart and having magnetically opposing poles facing each other. As the particles pass through this field in an uncured binder, they tend to rotate so that their easy axes align with the flux lines of such fields. Subsequently, the binder is cured for permanently setting the particles in this preferred orientation.

There is a drawback with the foregoing approaches in that these particles have a tendency to become quickly misaligned as they leave the orientation field and travel to the curing station. Moreover, the flux lines of these conventional permanent bar magnets are in a somewhat splayed relationship to one another.

Recently issued Japanese Patent Publication No. 55-163633(A) discloses a method of producing magnetic recording media having the particles aligned generally perpendicularly, while the coating is simultaneously air dried in the field. This approach has several shortcomings one of which being that it relies upon a conventional air drying technique which is considered too slow for commercial production.

Recently issued U.S. Pat. No. 4,407,853 describes a method, whereby electron beams irradiate a magnetic coating on a substrate for promoting rapid curing. Disclosed is, however, a preference for irradiating the layer subsequent to the magnetic orienting step, although simultaneous irradiating and orienting are mentioned. Besides however, the orienting techniques described generally make reference to using conventional, bar-type permanent magnets or electromagnets in a manner for effecting longitudinal orientation of the particles. Individual flux lines of these kinds of magnets tend to be in a somewhat splayed relationship to each other. Hence, the oriented particles would assume a generally splayed relationship. As noted, this relationship is less than ideal.

Beyond the foregoing disadvantages, none of the known techniques teaches minimizing chaining or roping of the particles subjected to the influence of a strong field. Chaining or roping tend to create surface imperfections on the recording media. Hence, a less desirable media is formed.

SUMMARY OF THE INVENTION

It is an object of the present invention to provide a method of and apparatus for producing magnetic recording media.

Towards this end there is provided a method which includes the steps of establishing a magnetic field in a region adjacent thereto having its lines of flux generally parallel over a portion of the region. Included in this method is the step of supporting a substrate having an uncured coating containing magnetic particles so as to facilitate alignment of the magnetic particles as they are in the generally parallel portion of the field, wherein the coating is disposed on at least one side of the substrate. Also included in the method is the step of directing a beam of energy through the coating from a side of the substrate opposite the side of the field as the latter passes through the magnetic field, thereby fixing the orientation of the particles in the coating. Consequently, the particles are maintained in the alignment dictated by the influence of the orienting magnetic field. Envisioned by the present invention is an apparatus for carrying out such a method.

In an illustrated embodiment, the energy is established by electron beams for rapidly curing the coating.

Among the objects of the invention are, therefore, the provision of a method of producing of magnetic recording media; the provision of a method of enhancing the density of magnetic particles with a preferred orientation in a magnetic recording medium; the provision of a method of simultaneously aligning the magnetic particles while increasing viscosity of the binder containing such particles to such an extent as to permanently fix the particles in the aligned orientation; the provision of a method of the foregoing type wherein electron beams irradiate an uncured coating containing the magnetic particles for rapidly fixing the particles in a given orientation induced by the field; the provision of a method of the foregoing type which uses a magnetic field having its lines of flux generally parallel to each other over a portion of their extent in a given direction for orienting the particles; the provision of a method of the foregoing type in which the orienting field is produced by rare earth permanent magnets; and, the provision of a method of the foregoing type wherein the field is on one side of the substrate while the electron beams are incident on the other side.

Other objects and further scope of applicability of the present invention will become apparent from the detailed description to follow when taken in conjunction with the accompanying drawings wherein like parts are designated by like reference numerals.

DETAILED DESCRIPTION

Figure 1:
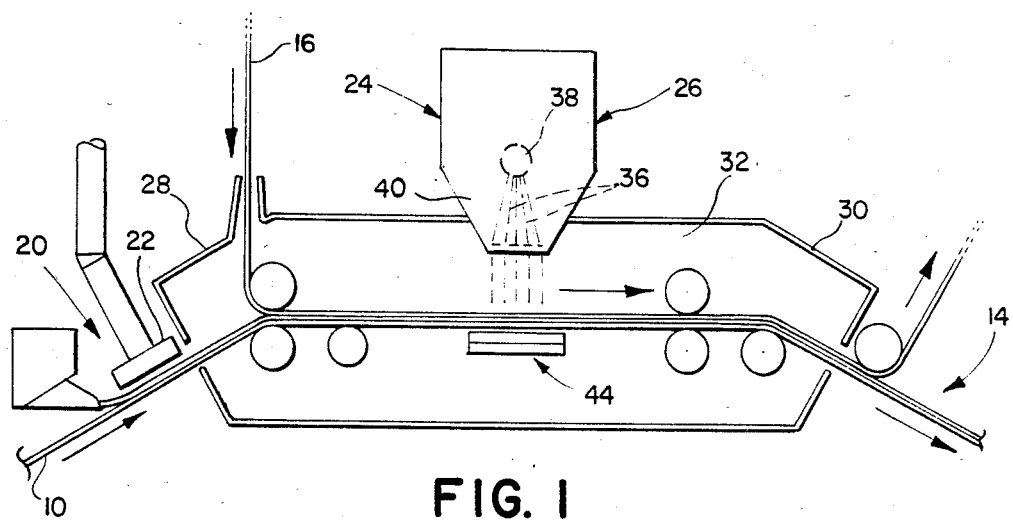
FIG. 1 is a diagrammatic view of a process for producing magnetic recording media.
Figure 2:
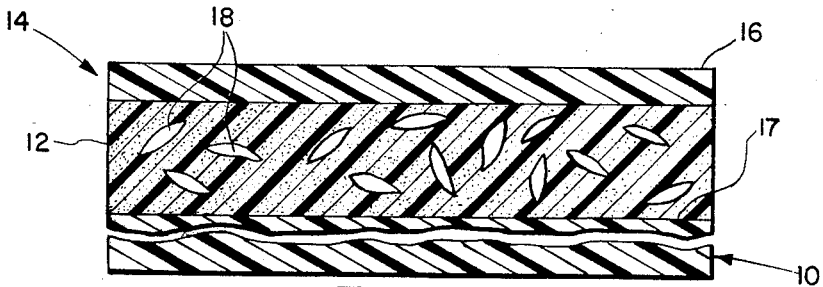
FIG. 2 is a cross-sectional view of a substrate having an uncured magnetic coating with the magnetic particles thereof in an unaligned condition; and, FIG. 3 is a cross-sectional view similar to FIG. 2, but with the magnetic particles oriented under the influence of a magnetic field.
Figure 3:
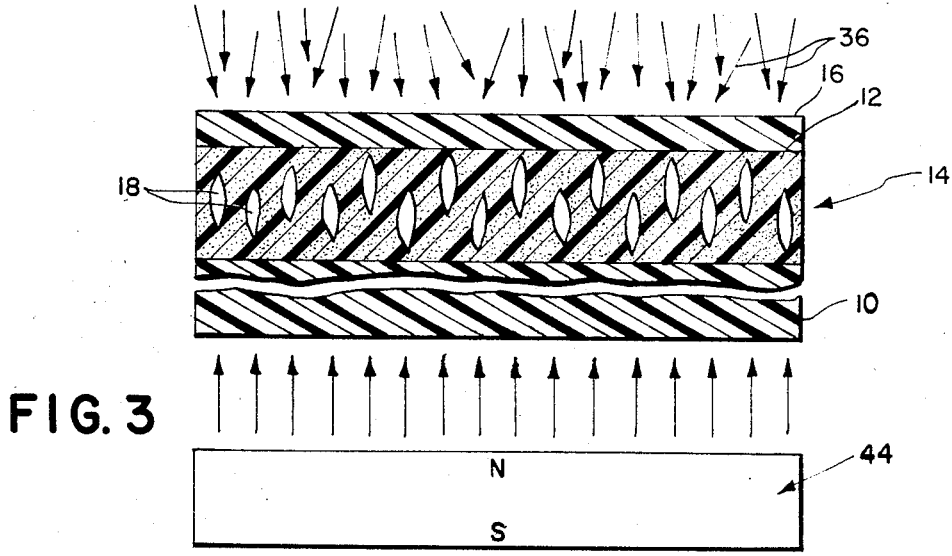

Reference is made to FIGS. 1-3 for illustrating an apparatus used for producing magnetic recording media. It is contemplated that such media have applicability for data recording purposes; particularly audio and video uses.

Depicted is a carrier or supporting substrate base 10 coated with a magnetic recording layer 12. During advancement, in the direction of the arrows, the recording layer 12 will undergo a series of processing steps which are adapted for forming a magnetic recording medium 14. This embodiment describes at least one recording layer 12 forming one of the layers of the medium 14. It will be appreciated that other layers, such as subbing layers, anti-static layers and other magnetic or non-magnetic layers (not shown) can be added.

Also shown, is a strippable particle retaining covering sheet 16. This covering sheet 16 is applied to the top surface of the magnetic recording layer 12 for purposes of inhibiting surface disruption caused by chaining or clumping of the magnetic particles under the strong magnetic field in the orienting step. This is advantageous since it promotes uniformity of particle distibution in the layer 12 and minimizes significantly surface disruptions thereof.

In this embodiment, the particle retaining cover sheet 16 is made of a very smooth material which is flexible, has sufficient beam strength to retain the particles in the layer 12, thereby minimizing significantly the disruptions caused by chaining of such particles when subjected to a very strong orienting field. The covering sheet 16 is applied to the layer 12 prior to orienting and after evaporation of the solvent. The particle covering sheet 16 will remain in intimate engagement with the layer 12 by reason of the wetness of the layer. Subsequent to orientation and curing the covering sheet 16 is peeled off, as will be described more fully. The particle covering sheet 16 is made of a thin sheet of polyethylene terephthalate which will not be adversely affected by electron beam curing. On the other hand, the sheet 16 has low mass. This is to minimize unwanted absorbtion of the electron beams by the sheet. In this regard, the cover sheet 16 has a thickness which is approximately equal to that of the carrier base 10. As a result, the desired polymerization of the layer 12 will occur when it is subjected to the electron beam curing step. To facilitate peeling the sheet 16 has a suitable release agent on the side which contacts the layer 12. The sheet 16 does not react to the electron beam curing step in a manner which would adversely affect the surface or curing of the magnetic layer 12. The retaining cover sheet 16 also provides another function insofar as it will impart to the top surface of a layer 12, high smoothness characteristics. In other words, one not having many craters or pock holes.

Other similar materials can be used for the particle covering sheet so long as they are smooth and have adequate beam strength for holding down the particles when they are subjected to the high magnetic forces of the orienting step. Moreover such materials should not deteriorate or warp when subjected to electron beams, and also not absorb too much of the beams so as to hinder polymerization of the layer 12.

Returning to the carrier base 10, it can be made from a wide variety of materials, typically used for magnetic recording media. These materials are generally dimensionally stable under environmental temperatures in which the recording media is typically used. These materials include, but are not limited to polyolefin groups, such as polyproplylene and the like; and polyester groups, such as polyethylene-terephthalate. In the present embodiment, the carrier base 10 is made of polyethylene-terephthalate.

Of course, the carrier base 10 can have a variety of configurations for magnetic recording purposes for example, tapes and floppy disks. In the illustrated embodiment, the carrier base 10 can be in the form of a tape having its thickness fall within a range standard for such kinds of tape. A double sided tape, for example, is also contemplated by the present invention. By double sided, it is meant that another magnetic recording layer would be on the opposite side of the substrate as well as a corresponding cover sheet. The resultant structure would look like a double-decker sandwich type arrangement, wherein the carrier base is the middle layer.

In this embodiment the thickness of the base or tape may be in the range of 0.3 to 0.75 mils. The carrier base 10 is treated by known techniques before the magnetic layer 12 is applied. Details of such preparation do not, per se, form an aspect of this invention. Hence, a description thereof has been omitted.

The present embodiment discloses that the magnetic layer 12 can be applied to one surface 17 of the carrier base 10. A variety of coating techniques can be used for this purpose. In this connection, coating knives, doctor blades, dip coating, squeeze coating, reverse roll coating, etc. can be used. In this embodiment there is shown a squeeze coating station generally at 13, which applies the material in the desired manner.

The composition of the magnetic layer 12 includes essentially anisotropic magnetic particles 18 dispersed in a binder-solvent solution. These particles 18 are generally uniformly dispersed in a solution comprising a binder which is polymerizable by electron beam energy and a solvent which evaporates by known hot air drying techniques. Of course, the layer 12 can include conventional additives, such as a lubricant, an abrasive agent, corrosion inhibitor, antistatic agent, etc. Details of such materials have not been described. The magnetic layer 12 when applied in a wet condition can have a thickness which is suitable for forming a magnetic recording tape. A thickness, for instance, in the range of ½ to 10 microns is useful. Such a range permits the usual size distribution of magnetic particles used in recording media to rotate and assume a perpendicular orientation under the influence of the magnetic orienting field without projecting from the top surface of the layer 12. The foregoing description of thickness ranges is given for purposes of illustration and not limitation. Although this embodiment discloses use of a solvent, it should be pointed out that a suitable electron beam curable binder without a solvent may be utilized instead.

In regard to the particles 18, they can be of the anisotropic ferromagnetic type; such as gamma-$Fe_2O_3$, cobalt-doped gamma $Fe_2O_3$; $Fe_3O_4$; cobalt-doped $Fe_3O_4$; and other known ferromagnetic fine powders. Although ferromagnetic powders have been described, it should be appreciated that other magnetic particles can be used. Magnetizable particles can be used as well.

In the illustrated embodiment, these particles 18 can have an acicular or rice-like shape, such as shown in FIGS. 2 and 3. Typically, they have a rather low length/diameter ratio (3:1 to 10:1). A range for the lengths of such particles can be 0.25 to 0.7 microns. The particles 18 are added in an amount, by weight, with respect to the binder and solvent solution, that is conventional for the making of magnetic recording media. Of course, such amounts are in general determined by the eventual end use of the media. For example, floppy disks have different amounts than say recording tape. Also, the particles can have a needle-like shape in which case they have a higher aspect ratio than acicular-shaped particles.

The particles 18 can be arranged so at to have their easy axes of magnetization aligned randomly; see FIG. 2. For facilitating this dispersion a dispersing agent is used. As will be described, the particles 18 are given a preferred orientation by a magnetic orienting field before they are frozen or fixed in the layer 12 by curing.

Now reference is made to the binder. It should be of the type that is not only usable for making magnetic recording media, but be electron beam curable as well.

In this regard, the binder can include compounds containing an acrylyl group; an acrylamido group; an allyl group; a vinyl ether group; and, unsaturated polyesters. The foregoing examples are illustrative of some of the compounds which are electron beam curable. They are not all inclusive.

In this embodiment the binder compound can be IBMA which is a liquid monomer that can be polymerized under the application of an electron beam curing step. IBMA is an abbreviation of isobutoxymethylolacrylamide. The IBMA in this embodiment was obtained from American Cyanamid Corp., New York.

A variety of solvents can be used as well, for example, ketones, such as acetone; esters, such as methyl acetate; ethers and glycol ethers, such as glycol dimethyl ether; tolulene etc. These solvents should have boiling points reached easily in conventional hot air drying apparatus of the type utilized in the magnetic recording media art. The solvent is evaporated prior to irradiation and orienting. Otherwise its presence tends to inhibit cohesion, while promoting uneven particle distribution. In this embodiment, a solvent that can be used is cyclohexanane, which is commercially available. At this juncture of the description it should be clear that the present invention envisions a wide variety of suitable binder/solvent solutions for use in making magnetic recording media consistent with the principles of the present invention.

With reference again to FIG. 1, it will be seen that the advancing carrier web 10 passes a coating station 13 whereat the magnetic recording layer 12 is applied by virtue of a squeeze coating technique. Such a technique, per se, does not constitute an aspect of the present invention. Hence, it will not be discussed in detail. Following application of the recording layer 12, the coated web is advanced passed a hot air drying zone 20. At this zone a hot air drying device 22 serves to initiate evaporation of the solvent in the magnetic recording layer 12. In this regard, conventional air drying temperatures can be used.

The travelling speed of the web 10 can be controlled by suitable means not shown and not forming part of the present invention. In this embodiment, a speed of about 50 ft/min is adequate for purposes of carrying out the method according to this embodiment. Although air drying commences before magnetic orientation, the magnetic layer 12 is still fluid enough to permit physical orientation of the magnetic particles 18 as will be described presently. Air drying further diminishes the solvent in the air. This promotes safety by lessening the possibility of explosion of such solvent when subject to electron beam energy. Although a preliminary drying step is performed such a step can be eliminated. Other equivalent drying techniques can be used. Whatever drying technique is used, however, it should not alter the viscosity of the layer 12 to a point which hampers particle orientation under the influence of the magnetic orienting field. As noted, although solvent is used, the present invention envisions an electron beam curable binder having magnetic particles without solvent.

Following the hot air drying the carrier web or substrate 10 advances to an electron beam curing station generally indicated at 24. Essentially, the electron beam curing step involves irradiating the magnetic layer 12 with energy in the form of electron beams. Such energy initiates polymerization of the binder. Viscosity of the binder increases such that the particles are frozen or fixed with the orientation determined by the magnetic orienting field. Continued irradiation effectively cures the layer 12. Also as the layer 12 cures it bonds to the base 10.

The electron beam curing step is carried out by a conventional electron beam apparatus 26; such as the type manufactured by Energy Sciences Inc. of Woburn, Mass. The inlet and outlet portions 28, 30 are sloped upwardly and downwardly; respectively, for preventing reflected electron beams from escaping. Prior to the coated carrier 10 entering an electron beam plenum chamber 32, it can pass a magnet (not shown) for moving the particles so that they can be later aligned.

Upon entering the plenum chamber 32 the coating 12 is irradiated with high energy and intensity electron beams 36. These beams 36 issue forth from an electron beam energy rod 38 contained in a high vacuum chamber 40. The beams 36 are focused such that they pass through a titanium window 42 and encompass a preselected area on the carrier web 10. The energy rod 38 is suitably operated so that it produces an acceleration voltage sufficient to effectuate the polymerization. This acceleration voltage can be in a suitable range, for example, from about 150 to 300 kilovolts. With an acceleration voltage of about 165 kilovolts the adsorbed dose in the layer 12 of the type described would be, but for the magnetic field, 8 to 10 megarads. Due to the magnetic field, the adsorbed dosage is about 4 or 5 megarads. This dosage is sufficient to cause complete curing of the layer 12 in about 0.1 seconds. It will be appreciated that the beams 36 can extend beyond the field. This insures completion of the curing. Although the curing need not be completed while the particles 18 are in the magnetic field, the dosage should be sufficient to effectuate polymerization to the point that viscosity increases, whereby particles become frozen or fixed in the desired orientation. Although a single beam of energy is used, a plurality of beams focused on different preselected areas is also contemplated.

The present invention also contemplates that other forms of energy can be used to bring about curing. For example ultraviolet energy might be used.

While the magnetic recording layer 12 is being cured under the influence of the electron beams 36, the magnetic particles 18 are subjected simultaneously to an orienting magnetic field. The field is such that it has its lines of flux generally parallel to each other over a portion of their extent in a given perpendicular direction. In this embodiment such a field is established by rare earth alloy magnets which have relatively very strong fields; such as samarium cobalt. These rare earth type magnets have relatively high coercivity with their flux lines being more closely parallel to each other than the flux lines of conventional bar-type magnets whose flux lines are in a somewhat splayed relationship to each other. By way of example, the coercivity of such magnets for purposes of the present invention can be 20,000 oersteds. A coercivity of about 10,000 oersteds would also be satisfactory. This invention, however, contemplates that conventional bar-type magnets can be used provided they have relatively high coercivity, whereby the lines of flux emanating from their surface are generally parallel for a distance which would be at least travel through the magnetic recording layer 12. Although conventional magnets can be utilized for such purposes, they would of necessity have to be relatively more expensive and larger than the rare earth type magnets. The layer 12 should therefore, pass in extremely close proximity to the face of the magnets. This is because the flux lines are more closely parallel in the region immediately adjacent the face of the magnet. Use of flux lines with such a profile as noted, is extremely advantageous insofar as the axes of the anisotropic magnetic particles 18 assume the orientation of the flux lines of such a field. As a result, there is a greater concentration of parallel magnetic particles 18 in a given area. Increased concentration of oriented parallel and perpendicular particles, of course, increases density packing of the particles.

In FIG. 1 there is depicted a magnetic assembly 44 for producing the noted field. In this embodiment, the assembly 44 includes a permanent magnet or magnets of the rare earth alloy type; such as samarium cobalt. Such an assembly produces a field of the above type wherein the flux lines are heavily concentrated and extend from the top surface of the assembly 44, in substantially parallel fashion through the layer 12. It should be appreciated that these lines of flux are more generally parallel closer to the magnetic assembly 44 and the further from that magnet the lines of flux bifurcate as they return to the opposite pole. This invention utilizes that portion of the field in which the lines of flux are generally parallel to each other. The strong field deflects, however, some of the electron beams, but as noted, not enough to prevent curing of the layer 12.

It will be noted that the magnetic assembly 44 is positioned below the surface of the carrier base 10 and beneath the preselected area covered by the electron beams. In this regard, the magnetic field produced by the permanent magnets extends through the layer 12 to orient the magnetic particles 18 in the direction of the arrows. The magnetic assembly 44 extends such that it effects particle alignment prior to irradiation by the electron beams. Alternatively, a shield could block some of the electron beams so as to give time for the particles to align before they are fixed. It will be seen that the particles 18 tend to become perpendicularly aligned. The drawings of FIGS. 2 and 3 are illustrative only and do not reflect the actual number, concentration or the relative size of the particles, or for that matter the relative thickness of the base 10 or layer 12.

The strength of the magnetic assembly 44 and the spacing between it and the bottom of the layer 12 can be selected so as to minimize the possibilities of surface disruptions caused by chaining or roping of the particles and the like when in the field. As noted, the covering sheet 16 serves to prevent such disruptions caused by the particles tending to accumulate under the influence of the field. Subsequent to the curing, the covering sheet 16 is peeled off from the layer 12 by the peeling roller.

According to the present invention it makes no difference on which side of the substrate the field is on so long as the electron beams are incident on the layer 12 from the other side. Such a relationship diminishes the deflection of the electron beams caused by the field enough so that rapid curing can take place.

Thus, the permanent magnet assembly 44 is below the base 10 and the field produced does not deflect significantly the electron beams emanating from the energy rod 38. As noted, however, there is a drop in the adsorbed dosage because of the field. Such drop though should not impede rapid curing. Of course, the magnetic field must be strong enough to orient the magnetic particles 18 despite such a viscosity increase. Towards this end, the magnetic assembly 44 should have high coercivity or stated differently high remanence. In this embodiment a remanence of about 9000 gauss could be used. Of course, other strengths can be employed. Whatever strengths are selected though, they should be sufficient in terms of orienting the particles for the purposes intended. The strength needed can be determined by a number of factors, for example, the viscosity of the binder/solvent solution, the kind of magnetic particles employed, the desired electron beam dosage for effecting curing, and the desire to minimize surface disruptions caused by the strength of the field.

The surface of the magnetic coating 12 may also be smoothed as by calendering or other suitable means.

Advantageously, the foregoing process allows the speedier production of magnetic recording media with greater overall concentration of magnetic particles 18 having a preferred orientation. In this embodiment such particles 18 will have a perpendicular orientation.

Although the illustrated embodiment discloses a tape being advanced along a linear path, the present invention contemplates that a coated disk could have a magnetic assembly rotated therebeneath or vise versa. The magnetic assembly extends in a generally radial direction with respect to the disk axis. Of course, an electron beam curing apparatus would be situated above the disk and the magnetic assembly. The disk can be cured and the particles oriented while the disk revolves.

The present invention also contemplates a batch process, whereby there need not be introduced relative motion between the magnetic layer and the magnetic assembly. Relative motion though is more desirable insofar as there tends to be a greater likelihood that more particles will assume a generally perpendicular orientation with respect to the base or substrate 10. What occurs in such a situation in an averaging effect, whereby the particles are subjected to successive generally parallel flux lines as they move. This is to be contrasted to a batch process, where the particles are subjected to the same flux lines, some of which are less perpendicular than the average flux line. Because of this averaging effect a greater number of particles will tend to be generally perpendicular. Such result is, of course, highly beneficial.

Since certain changes may be made in the above method and apparatus without departing from the scope of the invention herein involved, it is intended that all matter contained in the description or shown in the drawings be considered illustrative and not limiting.

What is claimed is:

1. Apparatus comprising:
   a device, having a surface from which emanates a magnetic field of high coercivity in a region adjacent thereto, said field having generally uniform and parallel lines of flux over a portion of the region;
   means for supporting a substrate having an uncured coating containing magnetically orientable particles immediately adjacent said surface to effect alignment of the particles generally consistent with the flux of the field as they are in the region of the generally parallel portion of the magnetic field, the coating being disposed on one side of the substrate; and
   means for directing electron beam energy through the coating from a side of the substrate opposite said device so that the coated substrate is in the generally parallel portion of the magnetic field to effect a freezing of the particles in the coating while the particles have been aligned by the generally parallel portion of the magnetic field.

2. The apparatus of claim 1 wherein the coating has a strippable covering sheet in overlying engagement therewith so as to minimize surface disruptions caused by the particles clumping together when subjected to the field.

3. The apparatus of claim 1 wherein said device established a unidirectional field.

4. The apparatus of claim 1 wherein said device includes high coercivity permanent magnets for establishing said field.

5. The apparatus of claim 4 wherein said high coercivity magnets are rare earth permanent magnets.

6. A system for producing magnetic recording media comprising:
   means for applying an uncured layer containing magnetically orientable particles onto a surface of a substrate;
   means for establishing a magnetic field and having a surface from which emanates lines of flux which are generally parallel to each other over a portion of their extent in a given direction from said surface;
   means for establishing relative motion between the field and the substrate to effect alignment of the magnetic particles as they are immediately adjacent said surface and in the generally parallel portion of the field, the layer being disposed on at least one side of the substrate;
   means for directing electron beam energy onto the layer as it passes through the magnetic field to effect a freezing of the particles in the layer, while the particles are maintained in alignment under the influence of the magnetic field wherein said directing means is on the side of the substrate opposite said means for establishing a field; and,
   means for applying a strippable covering sheet onto the uncured coating prior to subjecting the particles to the field so as to minimize surface disruptions caused by the particles clumping together in the field; and for removing the sheet from the coating subsequent to the orienting by the field.

7. The system of claim 6 wherein said device includes high coercivity permanent magnets for establishing said unidirectional field.

8. The system of claim 7 wherein said magnets are rare earth permanent magnets.

9. A method of producing magnetic recording media comprising the steps of:
   applying an uncured coating containing particles that can be oriented in a magnetic field onto a surface of a substrate;
   establishing a magnetic field having lines of flux generally parallel to each other over a portion of their extent in a given direction from a given surface;
   establishing relative motion between the field and a substrate having the uncured coating to effect alignment of the particles as they are in the generally parallel portion of the magnetic field immediately adjacent the given surface;
   directing electron beam energy through the coating as it passes through the magnetic field for freezing the particles in the coating while the particles are maintained in alignment under the influence of the field, wherein electron beam energy is incident on the side of the substrate opposite the side facing said means for producing said field; and
   applying a strippable cover to a surface of the uncured coating prior to passing through the field so as to retain the particles in the coating and thereby inhibit coating surface disruptions otherwise caused by chaining of the particles subjected to the field, and stripping the cover from the coating following orientation of the particles in the field.

10. The method of claim 9 wherein said directing step comprises directing electron beams at the coating so as to at least increase the viscosity of the coating so that the particles are frozen in the alignment influenced by said field.

11. The method of claim 10 wherein said step of establishing a field utilizes at least a magnet of the rare earth type.

12. The method of claim 11 wherein said rare earth magnet is samarium cobalt.

* * * * *